US012044035B2

(12) United States Patent
Yao et al.

(10) Patent No.: US 12,044,035 B2
(45) Date of Patent: Jul. 23, 2024

(54) HANDLE ASSEMBLY AND HOUSEHOLD APPLIANCE HAVING SAME

(71) Applicants: HEFEI HUALING CO., LTD., Anhui (CN); HEFEI MIDEA REFRIGERATOR CO., LTD., Anhui (CN); MIDEA GROUP CO., LTD., Guangdong (CN)

(72) Inventors: Jun Yao, Anhui (CN); Huixin Shi, Anhui (CN); Zhifang Ning, Anhui (CN)

(73) Assignees: HEFEI HUALING CO., LTD., Anhui (CN); HEFEI MIDEA REFRIGERATOR CO., LTD., Anhui (CN); MIDEA GROUP CO., LTD., Guangdong (CN)

( * ) Notice: Subject to any disclaimer, the term of this patent is extended or adjusted under 35 U.S.C. 154(b) by 281 days.

(21) Appl. No.: 17/441,678

(22) PCT Filed: Mar. 29, 2019

(86) PCT No.: PCT/CN2019/080460
§ 371 (c)(1),
(2) Date: Sep. 21, 2021

(87) PCT Pub. No.: WO2020/198950
PCT Pub. Date: Oct. 8, 2020

(65) Prior Publication Data

US 2022/0145662 A1 May 12, 2022

(51) Int. Cl.
*E05B 1/00* (2006.01)
*F25D 23/02* (2006.01)

(52) U.S. Cl.
CPC .......... *E05B 1/0015* (2013.01); *F25D 23/028* (2013.01)

(58) Field of Classification Search
CPC .............. A47B 95/02; A47B 2095/023; A47B 2095/024; A47B 2095/026; E05B 1/0015; E05B 2001/0023; F24C 15/024
(Continued)

(56) References Cited

U.S. PATENT DOCUMENTS 3,484,894 A * 12/1969 Fletcher ................. A47B 95/02 16/422
8,732,910 B1 * 5/2014 Paul ....................... A47B 95/02 16/444
(Continued)

FOREIGN PATENT DOCUMENTS

CN 201129902 Y 10/2008
CN 101418649 A 4/2009
(Continued)

*Primary Examiner* — Jeffrey O'Brien
(74) *Attorney, Agent, or Firm* — Seed IP Law Group LLP

(57) ABSTRACT

A handle assembly and a household appliance having same. The handle assembly comprises a mounting assembly (10) and a handle (20), the mounting assembly (10) comprises a pre-mounted piece (111) and retractable elements (112), handle grooves (1111) are provided on the pre-mounted piece (111), limiting bosses (21) are provided on the handle (20), and a limiting groove (213) is provided on each limiting boss. The limiting bosses (21) fit with the handle grooves (1111) to realize the mounting of the handle (20), and the retractable elements (112) can extend into the limiting grooves (213) to lock the handle (20), ensuring the high reliability of the mounting of the handle, so that a user can mount the handle on a household appliance without other specialized tools, improving the user experience, and achieving simple and reliable handle mounting.

9 Claims, 19 Drawing Sheets

(58) Field of Classification Search
USPC .................................................... 16/412, 413
See application file for complete search history.

(56) References Cited

U.S. PATENT DOCUMENTS

| | | | | |
|---|---|---|---|---|
| 8,813,995 | B2 | 8/2014 | Kim et al. | |
| 9,366,471 | B2 * | 6/2016 | Allen | F25D 23/028 |
| 2006/0143865 | A1 * | 7/2006 | Magyar | A47B 95/02 16/412 |
| 2015/0115785 | A1 * | 4/2015 | Allen | E05B 65/0042 312/319.2 |
| 2023/0063875 | A1 * | 3/2023 | Svensson | A47B 95/02 |

FOREIGN PATENT DOCUMENTS

| | | | | |
|---|---|---|---|---|
| CN | 102003108 | A | 4/2011 | |
| CN | 104633607 | A | 5/2015 | |
| CN | 108193936 | A | 6/2018 | |
| EP | 3879049 | A1 * | 9/2021 | E05B 1/0015 |
| JP | 2008-107052 | A | 5/2008 | |
| JP | 2017-106642 | A | 6/2017 | |
| KR | 2003-0003588 | A | 1/2003 | |
| KR | 20-0464311 | Y1 | 1/2013 | |
| KR | 10-1600313 | B | 3/2016 | |

* cited by examiner

SECTION A–A

HANDLE ASSEMBLY AND HOUSEHOLD APPLIANCE HAVING SAME

FIELD

This application relates to the field of household appliances, and more particularly to, a handle assembly and a household appliance having same.

BACKGROUND

At present, handles of household appliances (such as refrigerators) are generally mounted in a visible manner, that is, handles are fixed on doors through fixing screws. After the visible handle is mounted on the household appliance, a packaging volume of the whole household appliance is increased, which reduces the number of household appliances that may be transported in unchanged space. Especially for export-oriented household appliances, the freight of a single container is fixed and expensive.

Therefore, in order to increase the packing quantity in a single container, handles will not be mounted on the household appliances until the household appliances have been transported to users' houses, to reduce the volume of a single household appliance. However, since the existing handles can only be mounted by using special tools, they need to be mounted at home by after-sales personnel, which leads to an increase in the cost of the household appliances.

SUMMARY

The present disclosure aims to solve one of the above technical problems in the related art at least to a certain degree. Accordingly, the present disclosure proposes a handle assembly, which can be mounted on a door conveniently and reliably without the help of other special tools.

The handle assembly according to an embodiment of the present disclosure includes a mounting assembly including a pre-mounted member and a retractable element, in which a handle groove is arranged in the pre-mounted member, and the retractable element at least partially extends into the handle groove; and a handle provided with a limiting boss, in which the limiting boss is configured to be arranged in the handle groove and provided with a limiting groove, and the limiting groove is configured to secure the handle under the condition that the retractable element extends into the limiting groove.

For the handle assembly according to the embodiment of the present disclosure, the handle is provided with the limiting boss, the limiting boss is provided with the limiting groove, and the pre-mounted member of the mounting assembly is provided with the handle groove, such that the mounting of the handle and the pre-mounted member may be realized by the fitting between the limiting boss and the handle groove. Moreover, a part of the retractable element of the mounting assembly may extend into the limiting groove and lock the handle, to ensure high reliability of installation of the handle. Thus, the user may install the handle onto the object on which the handle needs to be mounted without using other special tools, which enhances user experience and makes the installation of the handle easy and reliable.

According to some embodiments of the present disclosure, a clamping slot is arranged on the pre-mounted member and in communication with the handle groove, and the retractable element is configured to move in the clamping slot.

Further, the mounting assembly further includes an elastic element connected to the retractable element and configured to push the retractable element towards the handle groove.

Further, the retractable element has an inclined guide surface, in which the inclined guide surface is configured in such a way that the handle presses the inclined guide surface and the retractable element is retracted from the handle groove when the handle moves along the handle groove towards the retractable element; the retractable element is configured to enter the limiting groove from the clamping slot under an elastic force of the elastic element when the limiting groove is aligned with the clamping slot. Further, the handle groove has a limiting step; and the limiting boss is a T-shaped boss and includes a long boss and a short boss, in which the long boss is configured to move in the handle groove, and the short boss is configured to be clamped between two limiting steps when the limiting groove is aligned with the clamping slot.

Further, an inner surface of the limiting step is spaced from a groove bottom of the handle groove.

For example, a height of the limiting step is at least greater than half of a height of the long boss.

For example, the mounting assembly further includes a retaining cap configured to confine the elastic element in the clamping slot.

For example, the elastic element is a spring. The household appliance according to embodiments of another aspect of the present disclosure includes a door and the above handle assembly arranged on the door.

Further, the pre-mounted member is integrated with the door.

Figure 1:
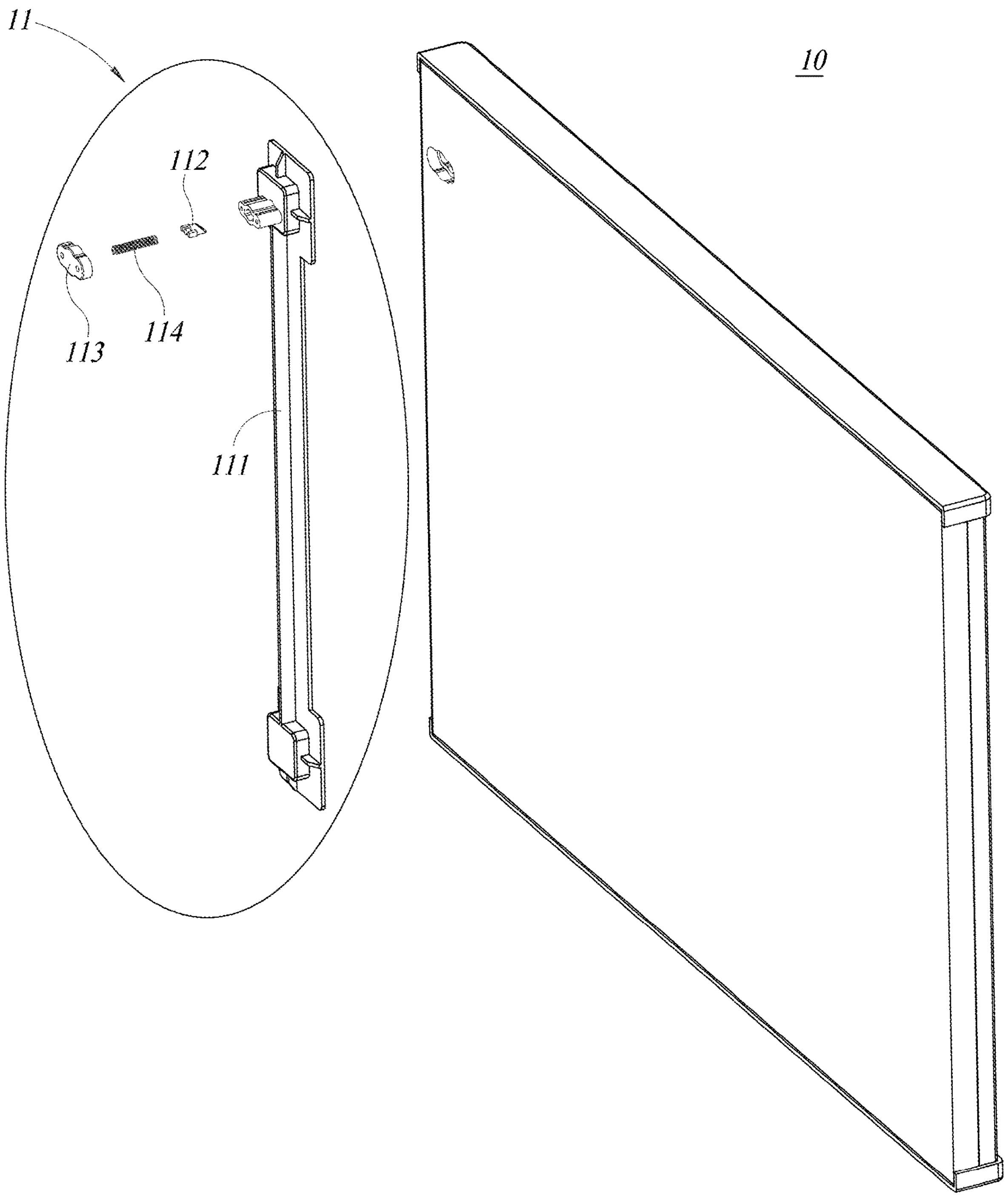
FIG. 1 is a schematic view where a handle assembly and a door are disassembled.

REFERENCE NUMERALS refrigerator 100, door 10, mounting assembly 11, pre-mounted member 111, handle groove 1111, limiting step 1111*a*, clamping slot 1112, retractable element 112, inclined guide surface 112*b*, retaining cap 113, elastic element 114, handle 20, limiting boss 21, long boss 211, short boss 212, limiting groove 213.

DETAILED DESCRIPTION

Embodiments of the present disclosure will be described in detail below, and examples of the embodiments will be shown in the accompanying drawings. The same or similar elements and the elements having same or similar functions are denoted by like reference numerals throughout the descriptions. The embodiments described below are exemplary and are intended to explain the present disclosure rather than limit the present disclosure.

In the description of the present disclosure, it is to understood that terms such as “length,” “width,” “thickness,” “upper,” “lower,” “left,” “right,” “vertical,” “horizontal,” “inner,” “outer” and the like should be construed to refer to the orientation as then described or as shown in the drawings under discussion. These relative terms are for convenience and simplicity of description and do not indicate or imply that the devices or elements referred to have a particular orientation and be constructed or operated in a particular orientation. Thus, these terms shall not be construed as limitation on the present disclosure.

In the present disclosure, unless specified or defined otherwise, terms “mounted,” “connected,” “coupled,” “fixed” and the like should be understood broadly, and may be, for example, fixed connections, detachable connections, or integral connections; may also be mechanical connections, may also be electrical connections or communicate with each other; may also be direct connections or indirect connections via intervening structures; may be inner communication or interaction of two elements, which can be understood by those skilled in the art according to specific situations.

A handle assembly according to embodiments of the present disclosure will be described in detail below with reference to FIGS. 1-19.

Referring to FIGS. 10, 11, 15 and 19, the handle assembly according to an embodiment of the present disclosure may include: a mounting assembly 11 and a handle 20 that is fitted with the mounting assembly 11.

Further, the mounting assembly 11 includes: a pre-mounted member 111 and a retractable element 112. The pre-mounted member may be pre-mounted on an object on which the handle 20 is to be mounted. For example, when the handle assembly is applied to a household appliance, the mounting assembly 11 may be located on a door 10 of the household appliance, and the pre-mounted member 111 is fixedly connected to the door 10. For example, the pre-mounted member 111 may be pre-embedded in a foam layer of the door 10.

A handle groove 1111 is arranged in the pre-mounted member 111. In some optional embodiments, the handle groove 1111 is located at each of an upper end and a lower end of the pre-mounted member 111, and the retractable element 112 may at least partially extend into the handle groove 1111. For example, the mounting assembly 11 is located on an inner side of the door 10, and the handle groove 1111 is exposed on an outer side of the door 10. The handle 20 may be mounted on the door 10 of the household appliance by being fitted with the mounting assembly 11. A user may pull the door 10 via the handle 20, so that the household appliance may be opened or closed, which facilitates the use of the household appliance. embodiments, the handle groove 1111 is located at each of an upper end and a lower end of the pre-mounted member 111, and the retractable element 112 may at least partially extend into the handle groove 111. For example, the mounting assembly 11 is located on an inner side of the door 10, and the handle groove 1111 is exposed on an outer side of the door 10. The handle 20 may be mounted on the door 10 of the household appliance by being fitted with the mounting assembly 11. A user may pull the door 10 via the handle 20, so that the household appliance may be opened or closed, which facilitates the use of the household appliance.

For the convenience of description, the installation of the handle assembly is illustrated by exemplified the household appliance as a refrigerator 100.

Figure 13:
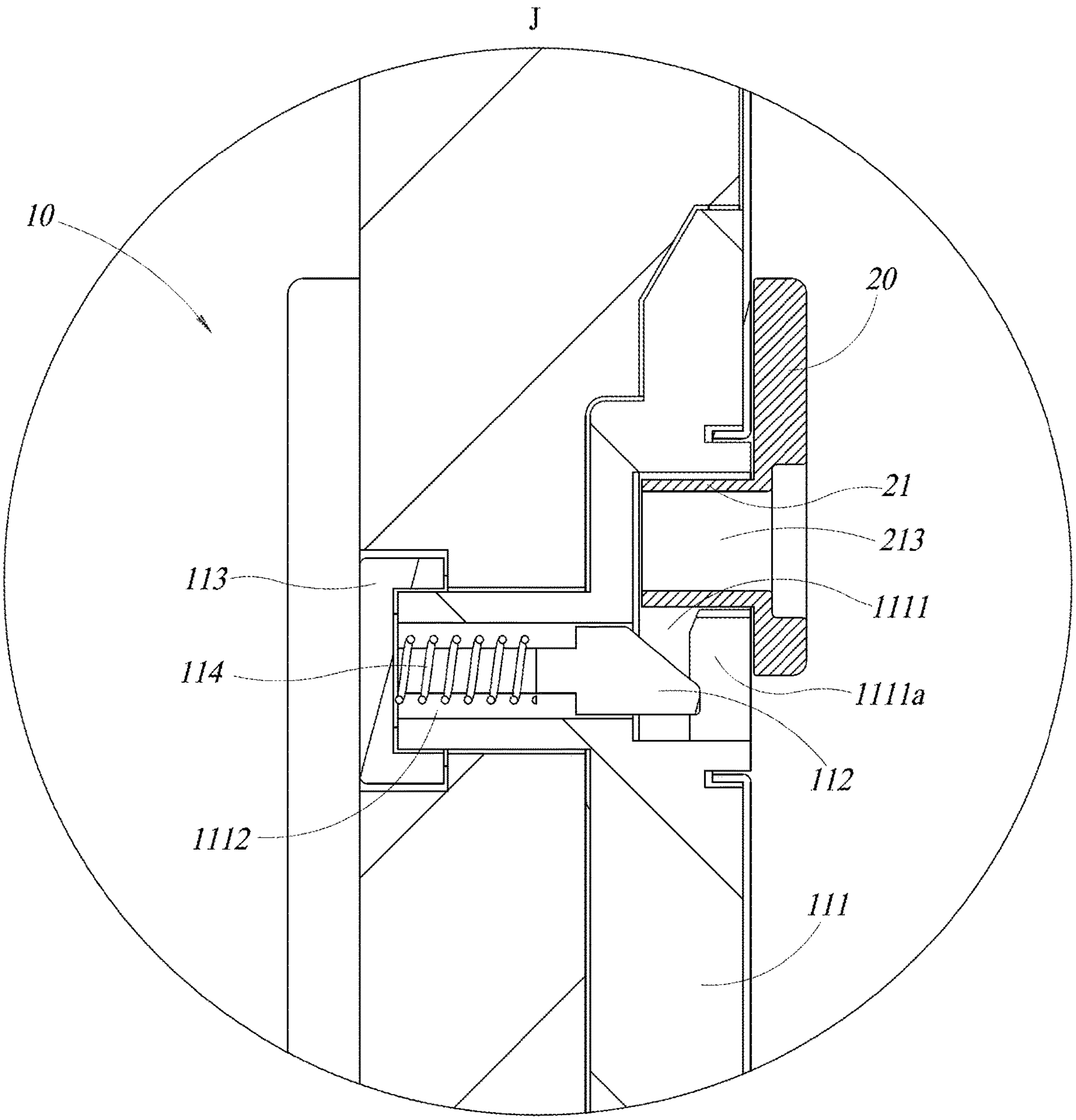
FIG. 13 is an enlarged view at J in FIG. 12.
Figure 14:
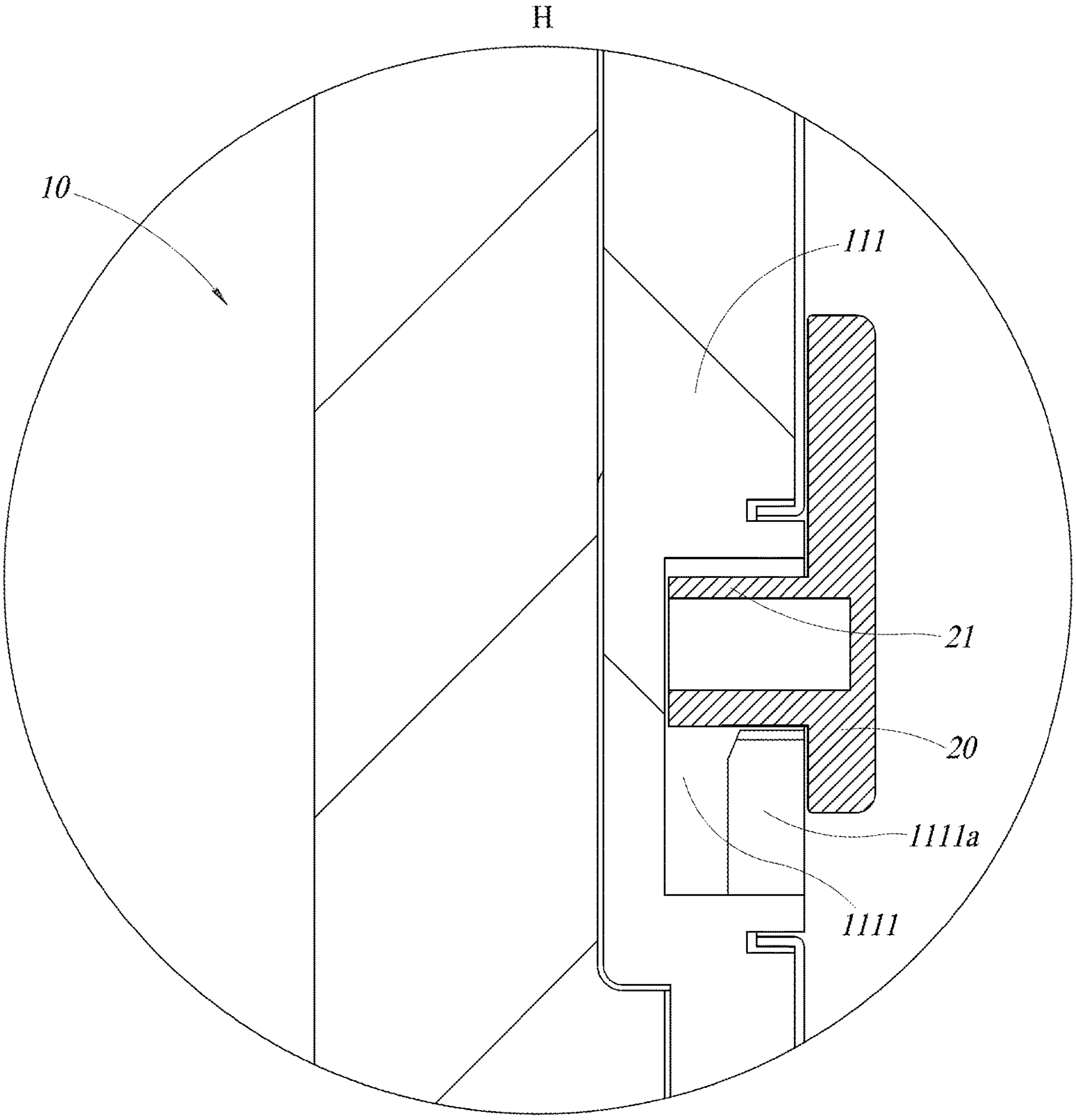
FIG. 14 is an enlarged view at H in FIG. 12.
Figure 15:
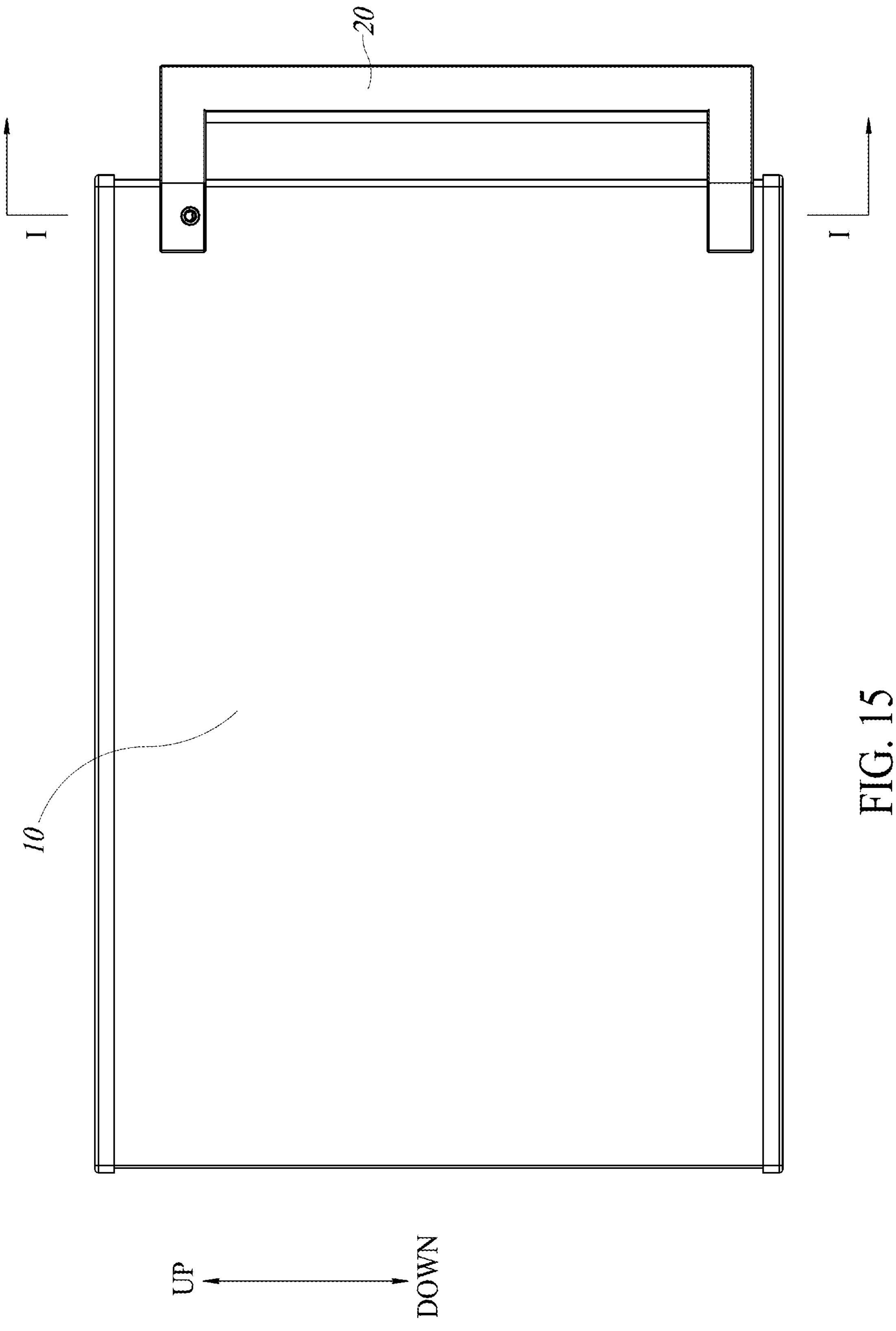
FIG. 15 is a front view where a door and a handle are completely fitted (i.e., a limiting boss of the handle is inserted into a handle groove behind a limiting step)
Figure 16:
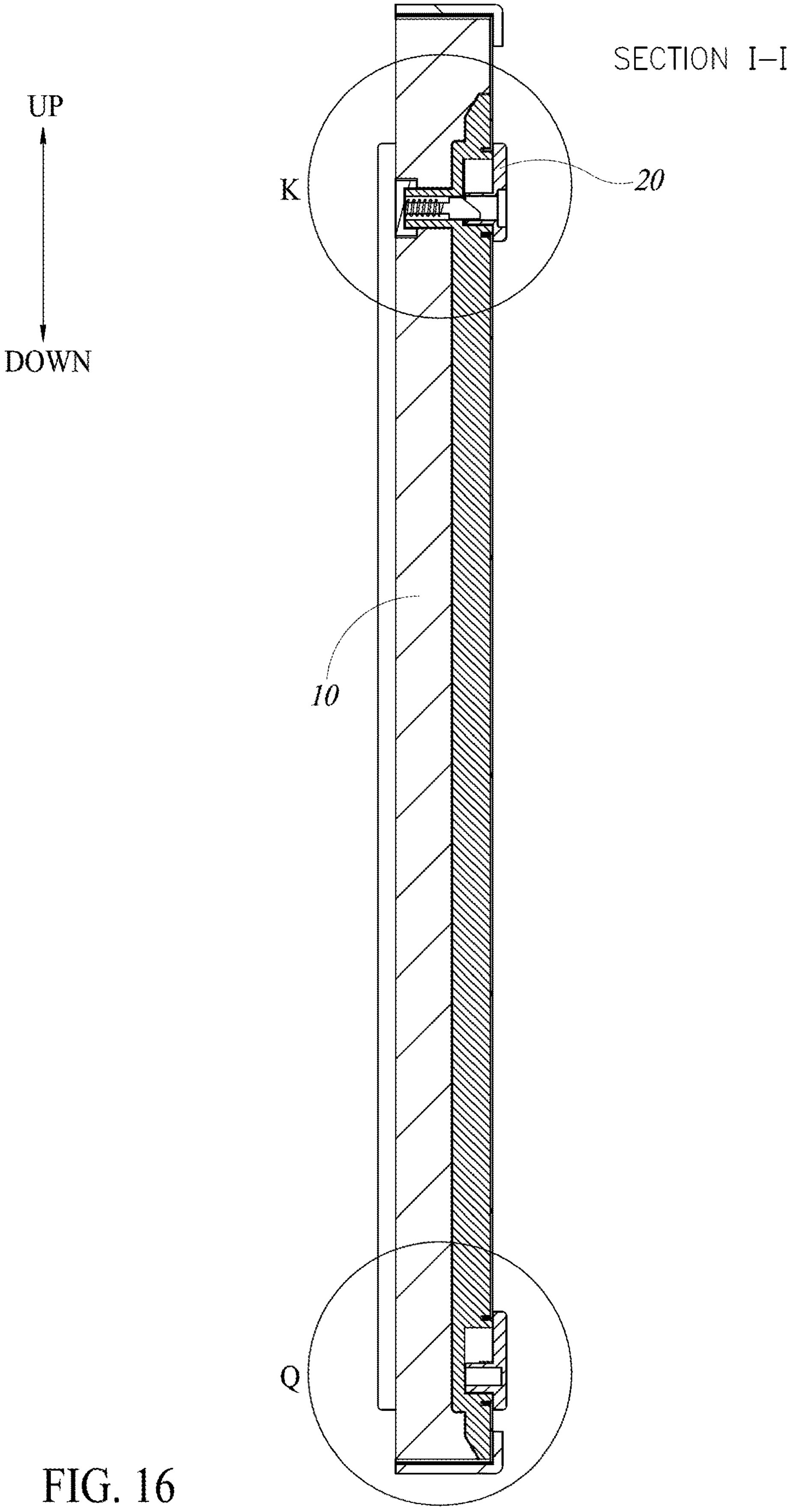
FIG. 16 is a sectional view taken along I-I in FIG. 15.
Figure 17:
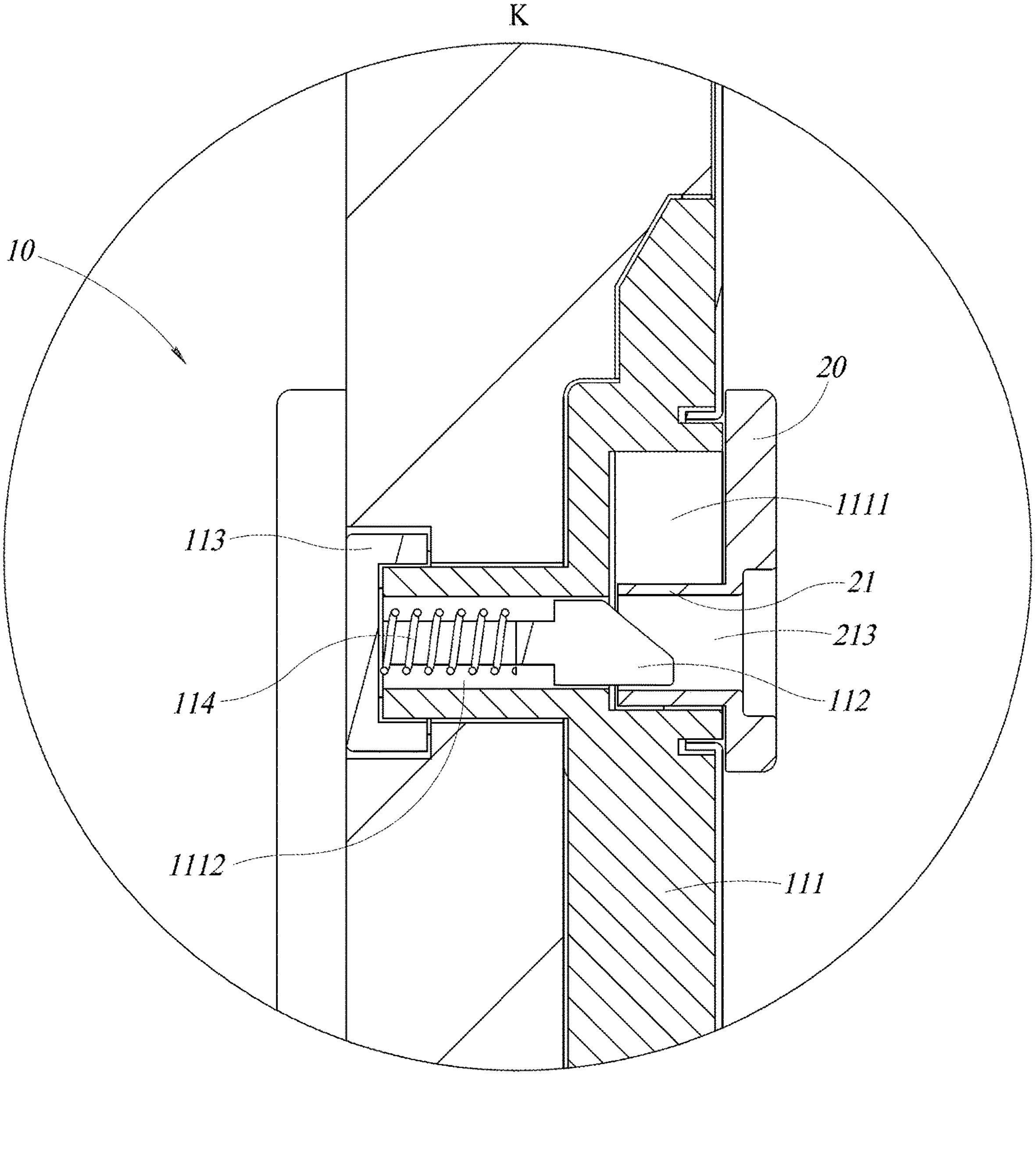
FIG. 17 is an enlarged view at K in FIG. 16.
Figure 18:
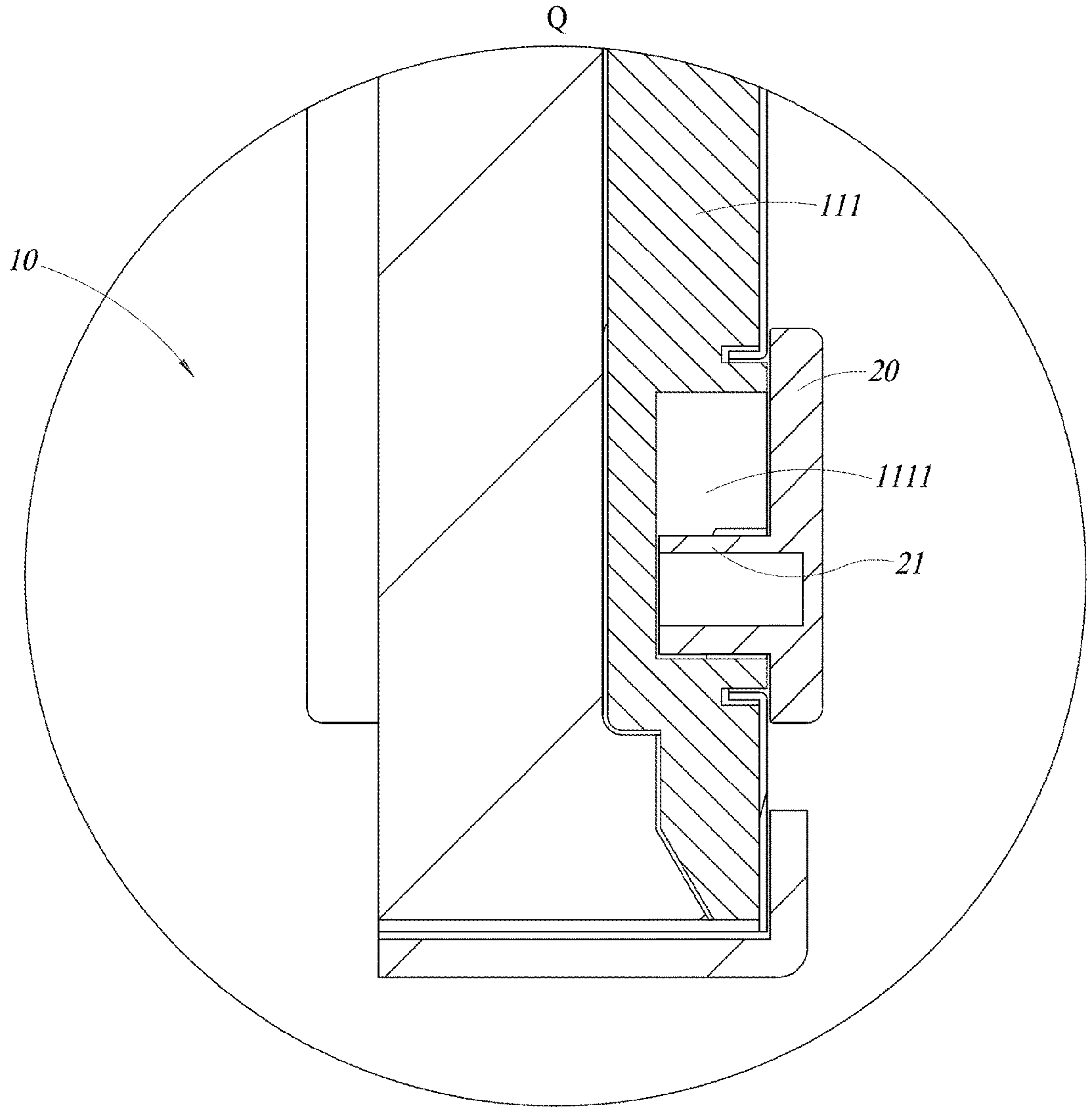
FIG. 18 is an enlarged view at Q in FIG. 16.
Figure 19:
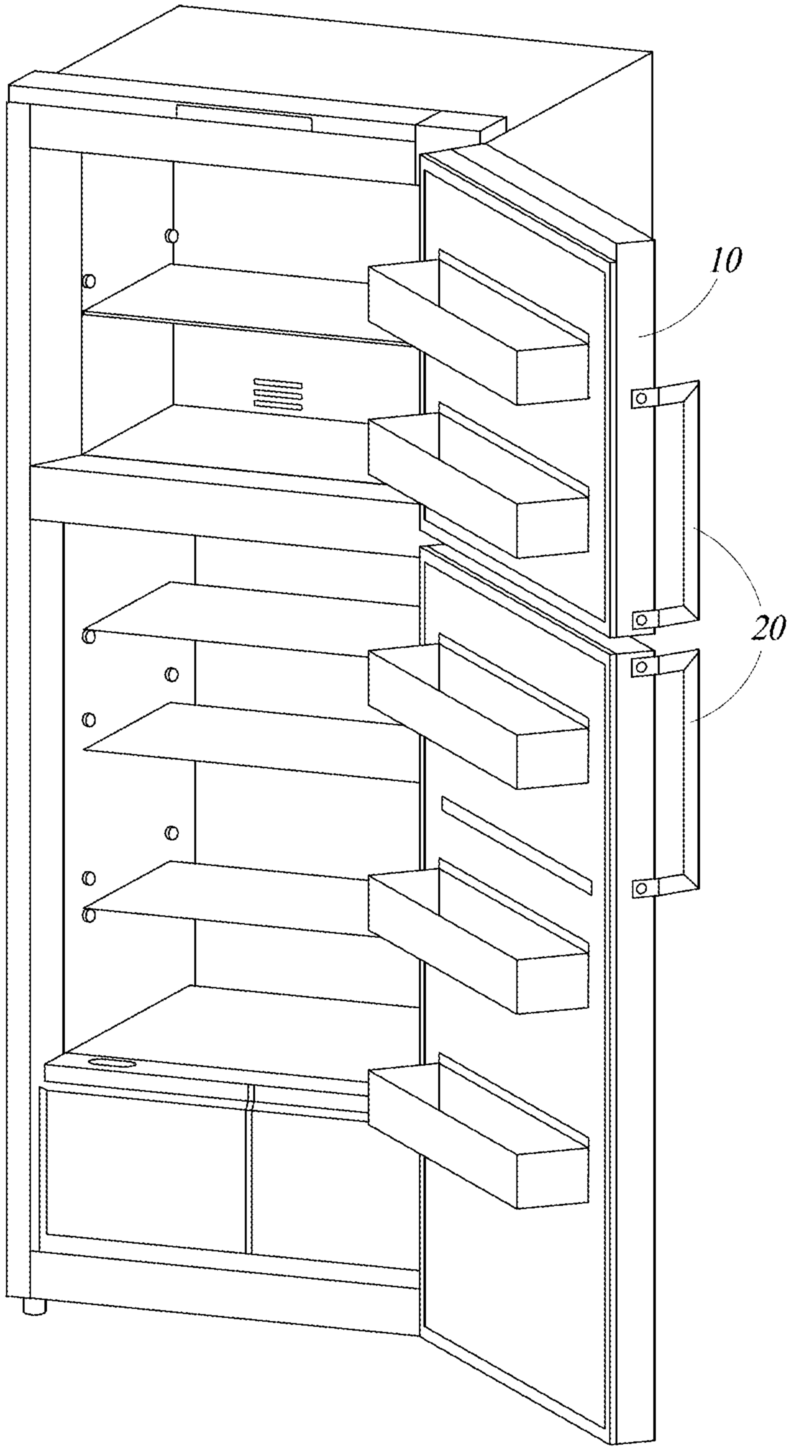
FIG. 19 is a schematic view of a refrigerator and a handle assembly.

In an embodiment, during production of a door 10 of the refrigerator 100, the pre-mounted member 111 may be pre-mounted in an inner foam layer of the door 10 to provide support for arranging the retractable element 112 and a retaining cap 113, and the handle groove 1111 may be exposed on an outer side of the door 10 to provide the possibility of fixing the handle 20 on the door 10. Further, as shown in FIGS. 13 and 17, a limiting boss 21 is arranged on the handle 20, and the limiting boss 21 is suitable for being arranged in the handle groove 1111. For example, the retractable element 112 may at least partially extend into the handle groove 1111, the handle 20 is provided with the limiting boss 21, and the limiting boss 21 is arranged in the corresponding handle groove 1111 and is movable in an up-down direction in the handle groove 1111. In some embodiments, the limiting boss 21 is arranged at each of an upper end and a lower end of the handle 20, and a distance between the limiting bosses 21 at the upper and lower ends of the handle 20 is equal to a distance between the handle grooves 1111 at the upper and lower ends of the pre-mounted member 111, to ensure that the limiting bosses 21 at the upper and lower ends of the handle 20 may be successfully fitted with the handle grooves 1111 at the upper and lower ends of the pre-mounted member 111, to fix the handle 20 firmly.

For example, a limiting groove 213 is arranged in the limiting boss 21 and configured to secure the handle 20 under the condition that the retractable element 112 extends into the limiting groove 213. The limiting groove 213 is a through hole running through the limiting boss 21. When the limiting boss 21 moves downward in the handle groove 1111, the retractable element 112 extends into the limiting groove 213, and meanwhile the handle 20 is secured. That is, at least one of the limiting bosses 21 at the upper and lower ends of the handle 20 is provided with the limiting groove 213. For example, the limiting groove 213 is provided only at the upper end of the handle 20, or the limiting groove 213 is provided only at the lower end of the handle 20, or limiting grooves 213 are provided at both of the upper and lower ends of the handle 20.

It shall be noted that when only the upper end of the handle 20 is provided with the limiting groove 213, only the upper end of the pre-mounted member 111 is correspondingly provided with the retractable element 112, an elastic element 114 and the retaining cap 113; or when a limiting groove 213 is provided only at lower end of the handle 20, a retractable element 112, an elastic element 114 and a retaining cap 113 are provided only at lower end of pre-mounted member 111; or when both of the upper and lower ends of the handle 20 are provided with the limiting grooves 213, each of the upper and lower ends of the pre-mounted member 111 is provided with the retractable element 112, the elastic element 114 and the retaining cap 113.

In order to better explain a cooperation process of the handle 20 and the door 10, the cooperation process of the handle 20 and the door 10 is illustrated via an example where the limiting groove 213 is arranged only at the upper end of the handle 20 and the handle 20 is arranged along a vertical direction, as shown in FIGS. 8-18.

In a specific embodiment, after the refrigerator 100 is sent to the user's home, the handle 20 and the door 10 are separate. When the user needs to mount the handle 20, the limiting bosses 21 at the upper and lower ends of the handle 20 are fitted with the handle grooves 1111 at the upper and lower ends which are exposed on the outer side of the door 10; the handle 20 is moved downward (i.e., being moved along the handle groove 1111 towards the retractable element 112 as described below); and at this time, the limiting groove 213 of the limiting boss 21 at the upper end of the handle 20 is aligned with the retractable element 112, and a part of the retractable element 112 extends into the limiting groove 213, limiting movement of the limiting boss 21 in the up-down direction, and restricting the limiting boss 21 of the handle 20 in the handle groove 1111 (i.e., the limiting boss 21 is locked), which may prevent the handle 20 from falling off the handle groove 1111. In such a way, the installation of the handle 20 is completed.

Moreover, when the user needs to dismount the handle 20, a fine rod capable of extending into the limiting groove 213 can be utilized. The fine rod extends into the limiting groove 213 to make the retractable element 112 retracted from the handle groove 1111 and thus the limiting groove 213, so that the handle 20 is withdrawn from the handle groove 1111. In such a way, the dismounting of the handle 20 is completed.

For the handle assembly according to the embodiment of the present disclosure, the handle 20 is provided with the limiting boss 21, the limiting boss 21 is provided with the limiting groove 213, and the pre-mounted member 111 of the mounting assembly 11 is provided with the handle groove 1111, such that the mounting of the handle 20 and the pre-mounted member may be realized by the fitting between the limiting boss 21 and the handle groove 1111. Moreover, a part of the retractable element 112 of the mounting assembly 11 may extend into the limiting groove 213 and lock the handle 20, to ensure high reliability of installation of the handle 20. Thus, the user may install the handle 20 onto the object on which the handle needs to be mounted (such as the door 10) without using other special tools, which enhances user experience and makes the installation of the handle 20 easy and reliable.

Further, referring to FIGS. 1-2, 5, 7, 13 and 17, a clamping slot 1112 is arranged on the pre-mounted member 111, the clamping slot 1112 is in communication with the handle groove 1111, and an axis direction of the clamping slot 1112 is perpendicular to a section of the handle groove 1111. The retractable element 112 is suitable to move in the clamping slot 1112 and may at least partially extend into the handle groove 1111. That is, by providing the clamping slot 1112, a moving track is provided for the retractable element 112 and can guide a moving direction of the retractable element 112, and a part of the retractable element 112 may also extend into the handle groove 1111, thus allowing the retractable element 112 to extend into the limiting groove 213. By providing the clamping slot 1112, the moving direction of the retractable element 112 may be ensured, so that the retractable element 112 may lock the limiting boss 21, ensuring high reliability of the handle assembly.

Further, referring to FIGS. 1-2, 5, 7, 13 and 17, the mounting assembly 11 may also include: an elastic element 114. The elastic element 114 is an elastic part. The elastic element 114 is always in a compressed state when it is located in the mounting assembly 11. In a specific embodiment, the elastic element 114 is connected with the retractable element 112 and is used to push the retractable element 112 towards the handle groove 1111. That is, the elastic element 114 is also located in the clamping slot 1112 and is in contact and connection with the retractable element 112. Under an elastic force of the elastic element 114, the retractable element 112 may be pushed towards the handle groove 1111, and a part of the retractable element 112 may be pushed into the handle groove 1111.

Figure 2:
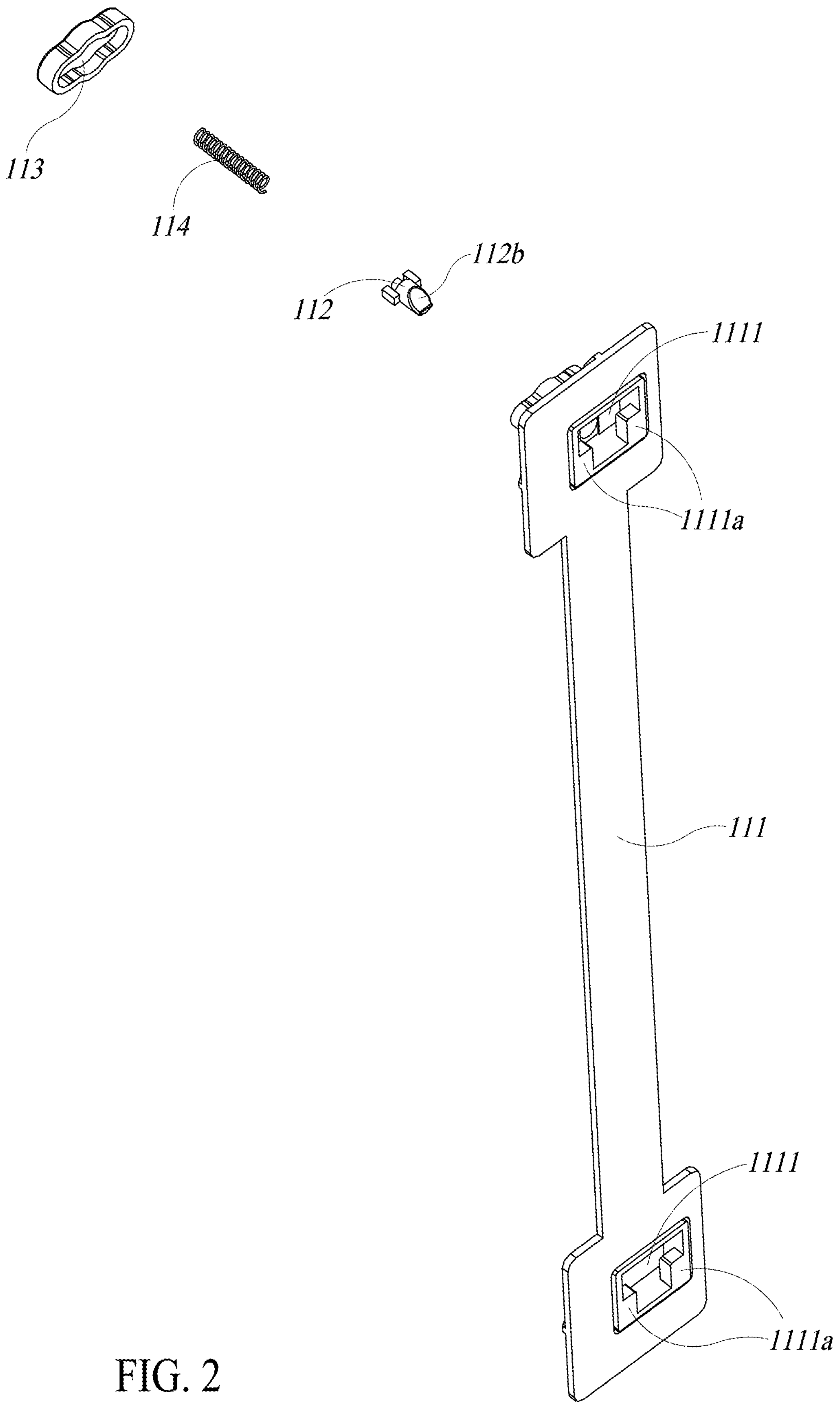
FIG. 2 is an exploded view of a mounting assembly.
Figure 3:
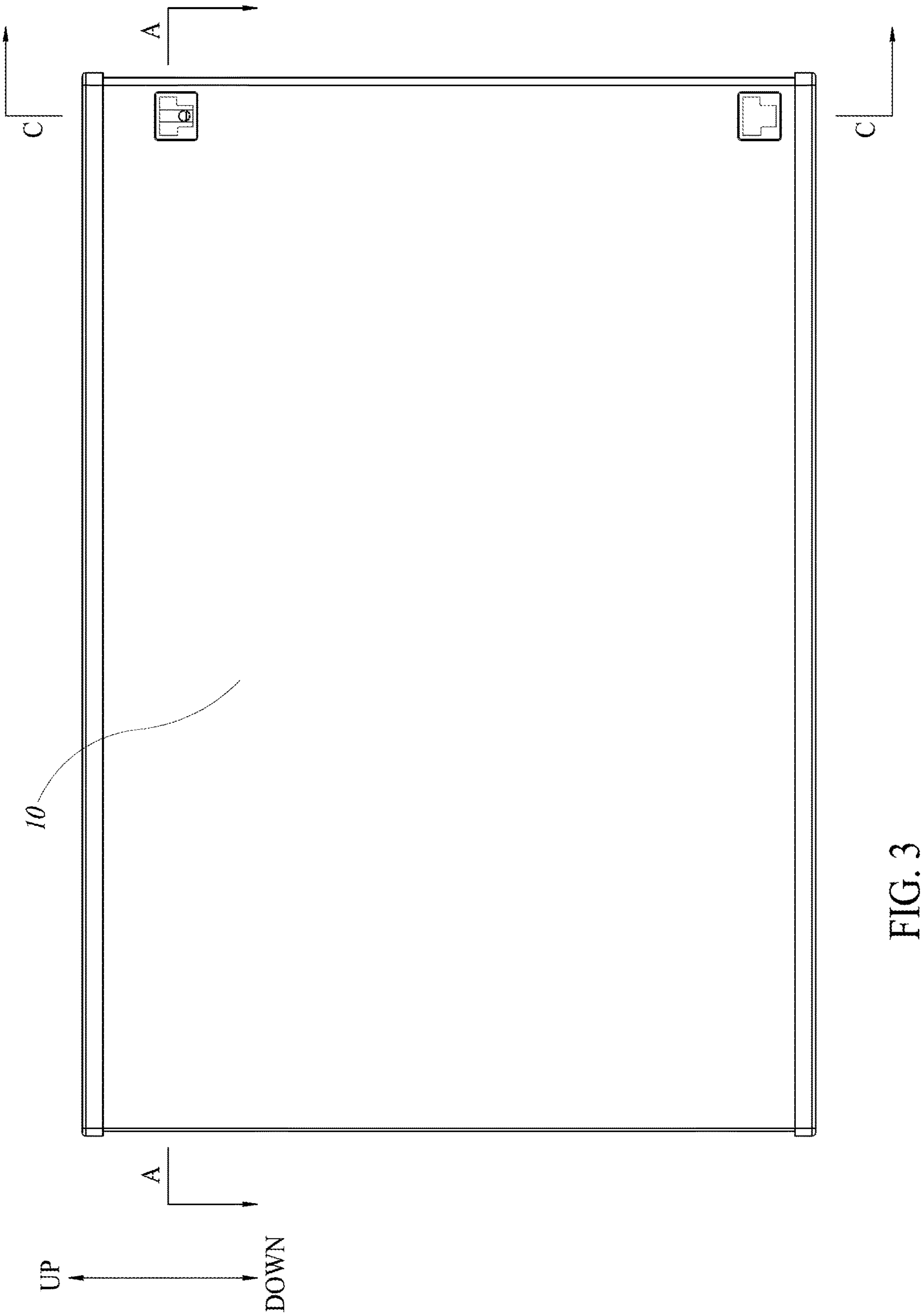
FIG. 3 is a front view of a door.
Figure 4:
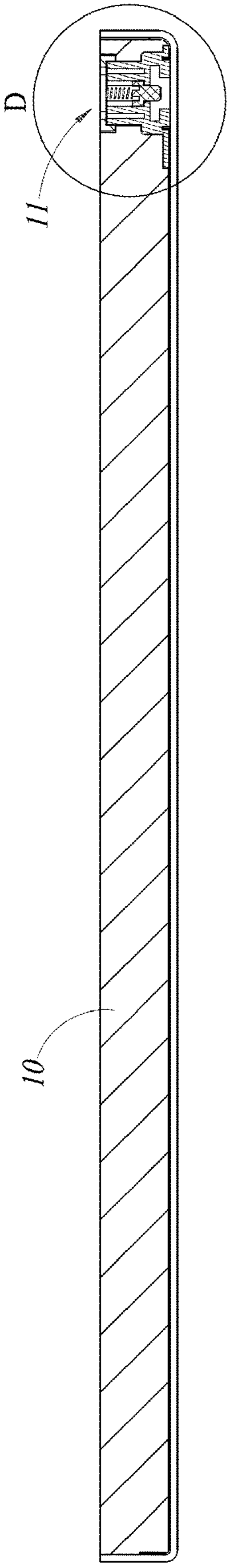
FIG. 4 is a sectional view taken along A-A in FIG. 3.
Figure 5:
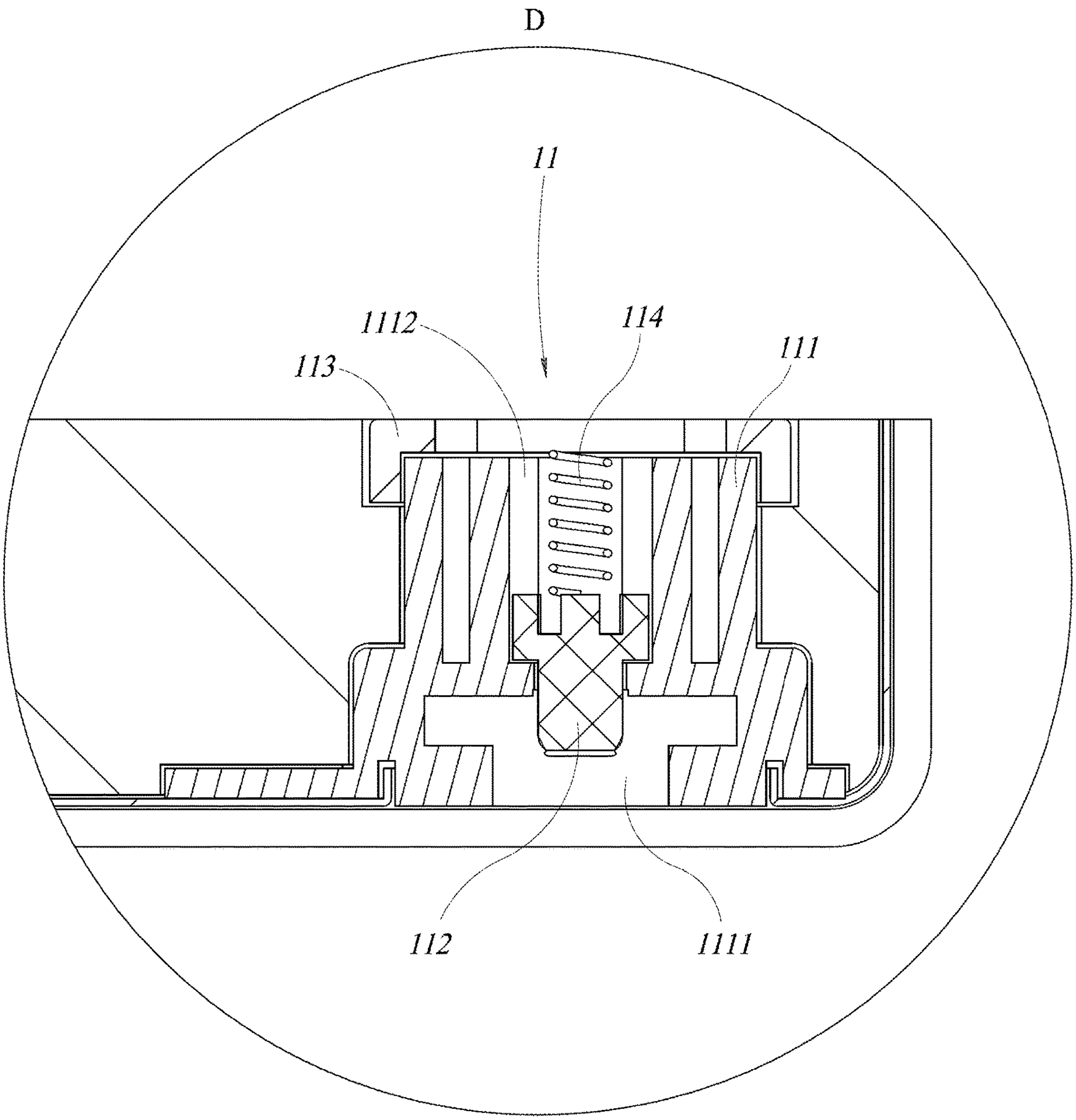
FIG. 5 is an enlarged view at D in FIG. 4.
Figure 6:
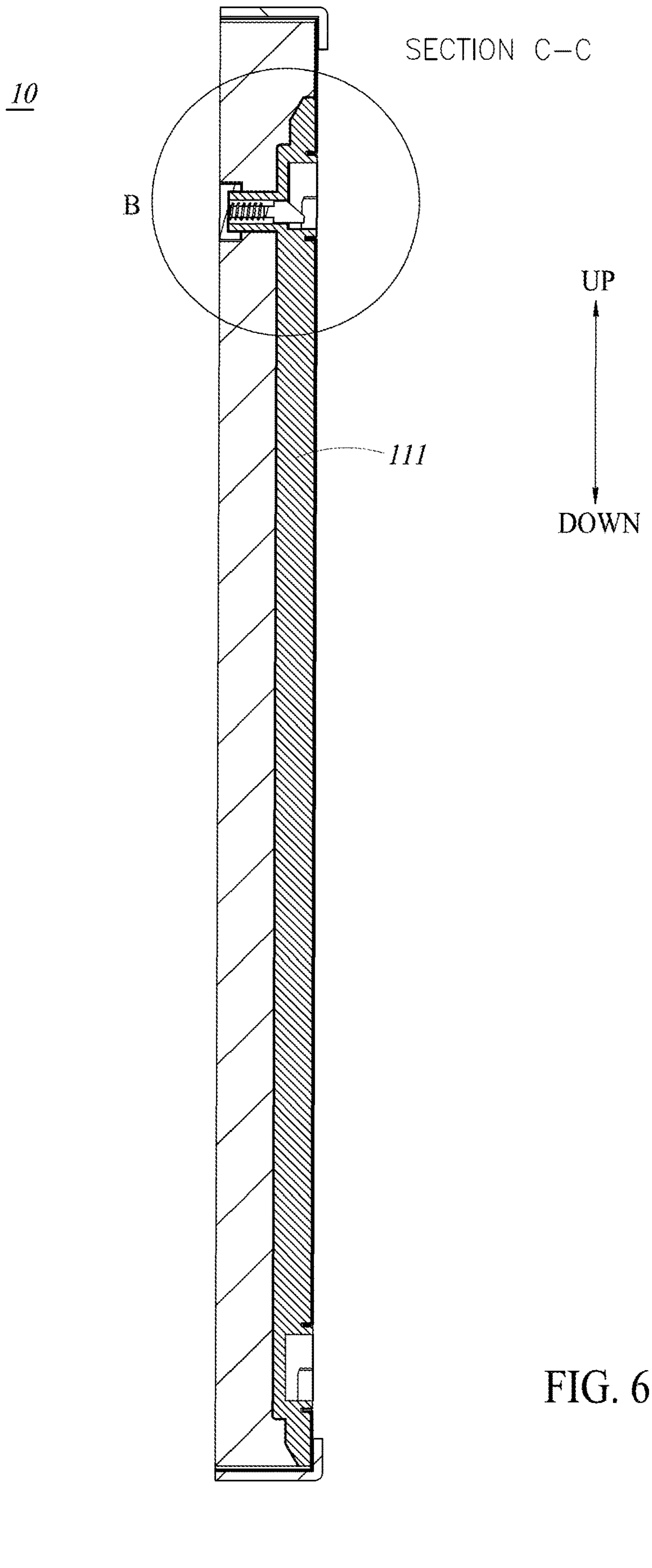
FIG. 6 is a sectional view taken along C-C in FIG. 3.
Figure 7:
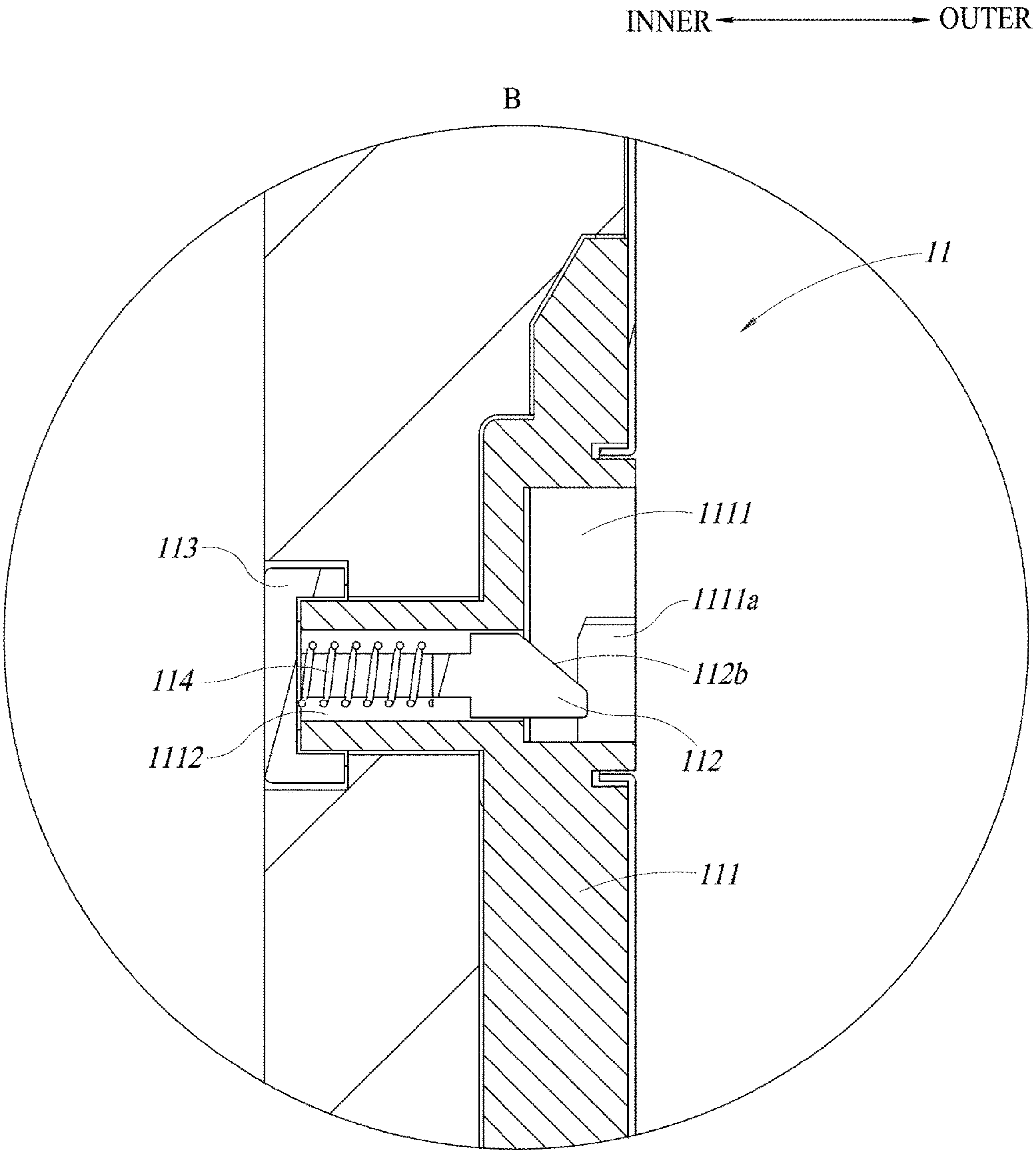
FIG. 7 is a sectional view at B in FIG. 6.
Figure 8:
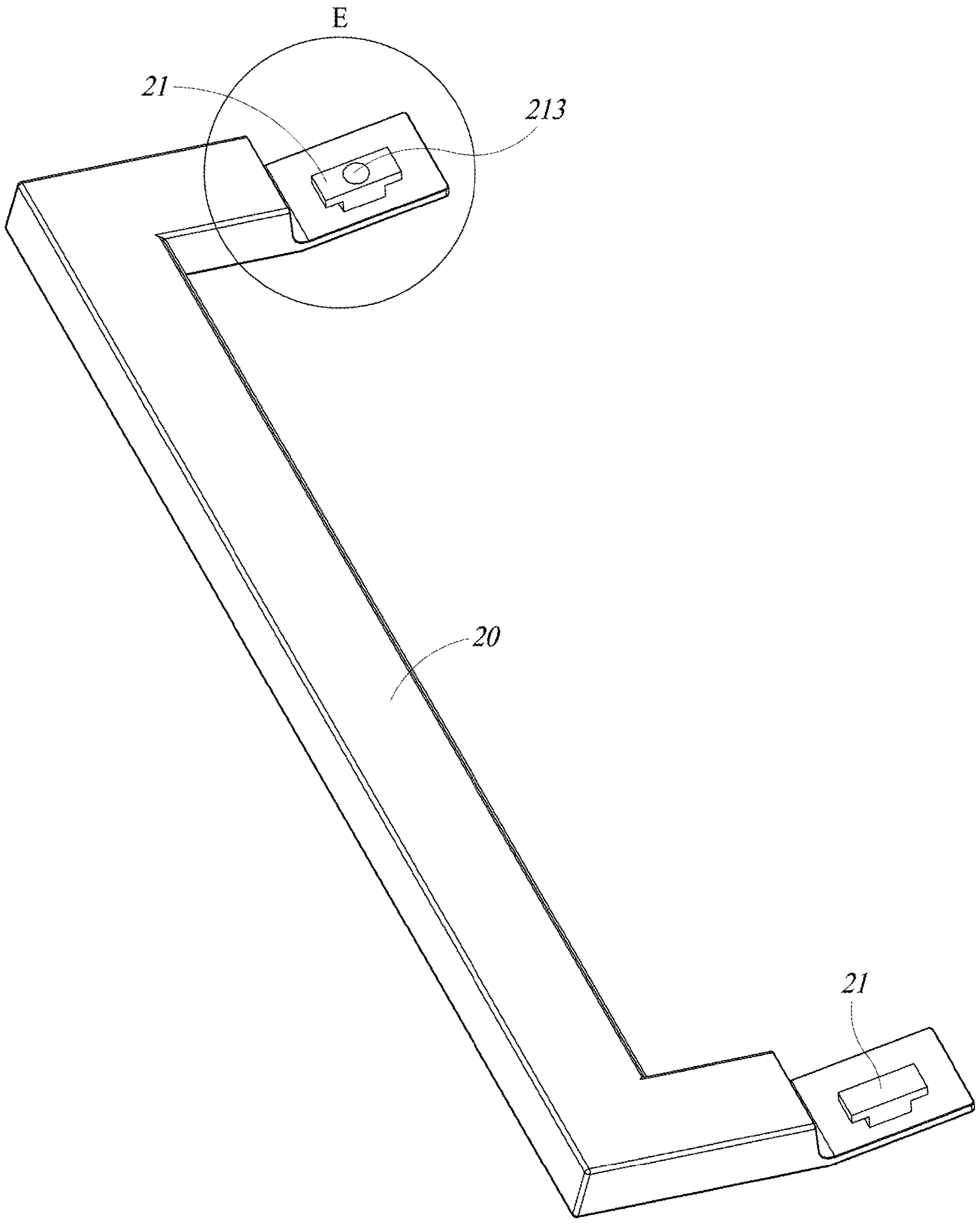
FIG. 8 is a perspective view of a handle.

Further, as shown in FIGS. 2 and 7, the retractable element 112 has an inclined guide surface **112*b*. The inclined guide surface 112*b* is configured as follows: the handle 20 presses the inclined guide surface 112*b* when the handle 20 moves along the handle groove 1111 towards the retractable element 112, so that the retractable element 112 is retracted from the handle groove 1111. The retractable element 112 is configured to enter the limiting groove 213 from the clamping slot 1112 under the elastic force of the elastic element 114 when the limiting groove 213 is aligned with the clamping slot 1112**.

That is, the inclined guide surface **112*b* is arranged at an end of the retractable element 112 which extends into the handle groove 1111. For example, the inclined guide surface 112*b* extends obliquely in a direction toward a lower and outer side of the refrigerator 100. Thus, when the handle 20 moves along the handle groove 1111 towards the retractable element 112 (i.e., moving toward a lower side of the handle 20), the limiting boss 21 of the handle 20 contacts the part of the retractable element 112 which extends into the handle groove 1111 (i.e., the inclined guide surface 112*b* of the retractable element 112). As the handle 20 moves further downward, the limiting boss 21 of the handle 20 presses the retractable element 112 downward. Since an extension direction of the inclined guide surface 112*b* is orientated obliquely toward the lower and outer side of the refrigerator 100, the retractable element 112 is subjected to a force component in a direction toward the inner side of the door 10. As a result, the retractable element 112 moves to the inner side of the door 10 and retracts from the handle groove 1111. At this time, the elastic element 114 is further compressed. As the handle 20 moves further downward, the retractable element 112 is aligned with the limiting groove 213 of the handle 20, and the retractable element 112 is pushed into the limiting groove 213 under the elastic effect of the elastic element 114. In such a way, the installation of the handle 20** is completed.

By arranging the inclined guide surface **112*b* on the retractable element, the retractable element 112 can be guided when pressed by the limiting boss 21, to ensure that the retractable element 112 may retract from the handle groove 1111, so that the handle 20 may move downward to an installation position and the retractable element 112 may extend into the limiting groove 213, thereby completing the installation of the handle 20**.

Further, as shown in FIGS. 7, 13-14 and 17-18, the handle groove 1111 has a limiting step **1111*a*, that is, the handle groove 1111 is a groove with the step, and a hollow inverted snap structure is arranged in the position of the limiting step 1111*a***.

Figure 9:
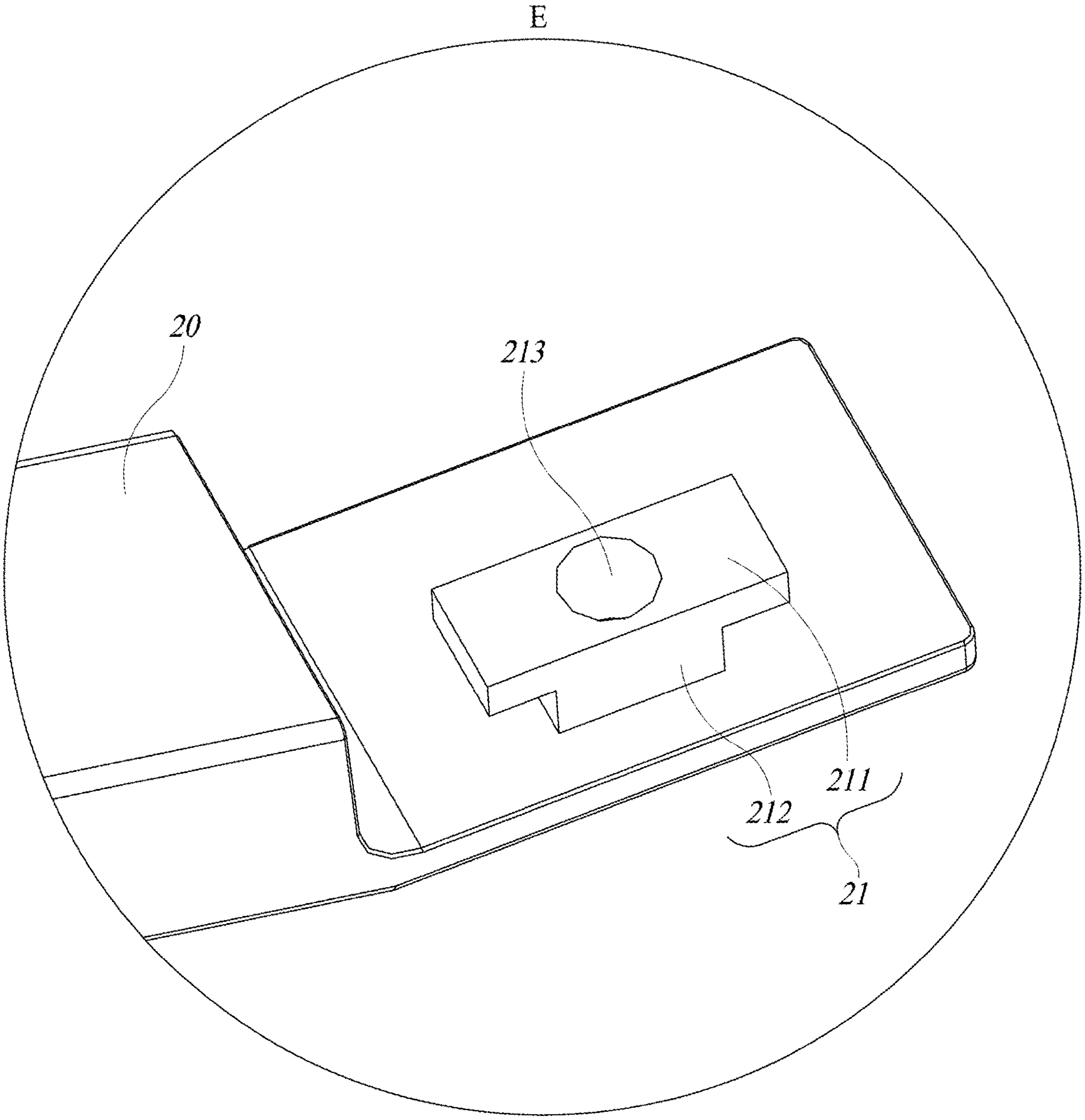
FIG. 9 is an enlarged view at E in FIG. 8.
Figure 10:
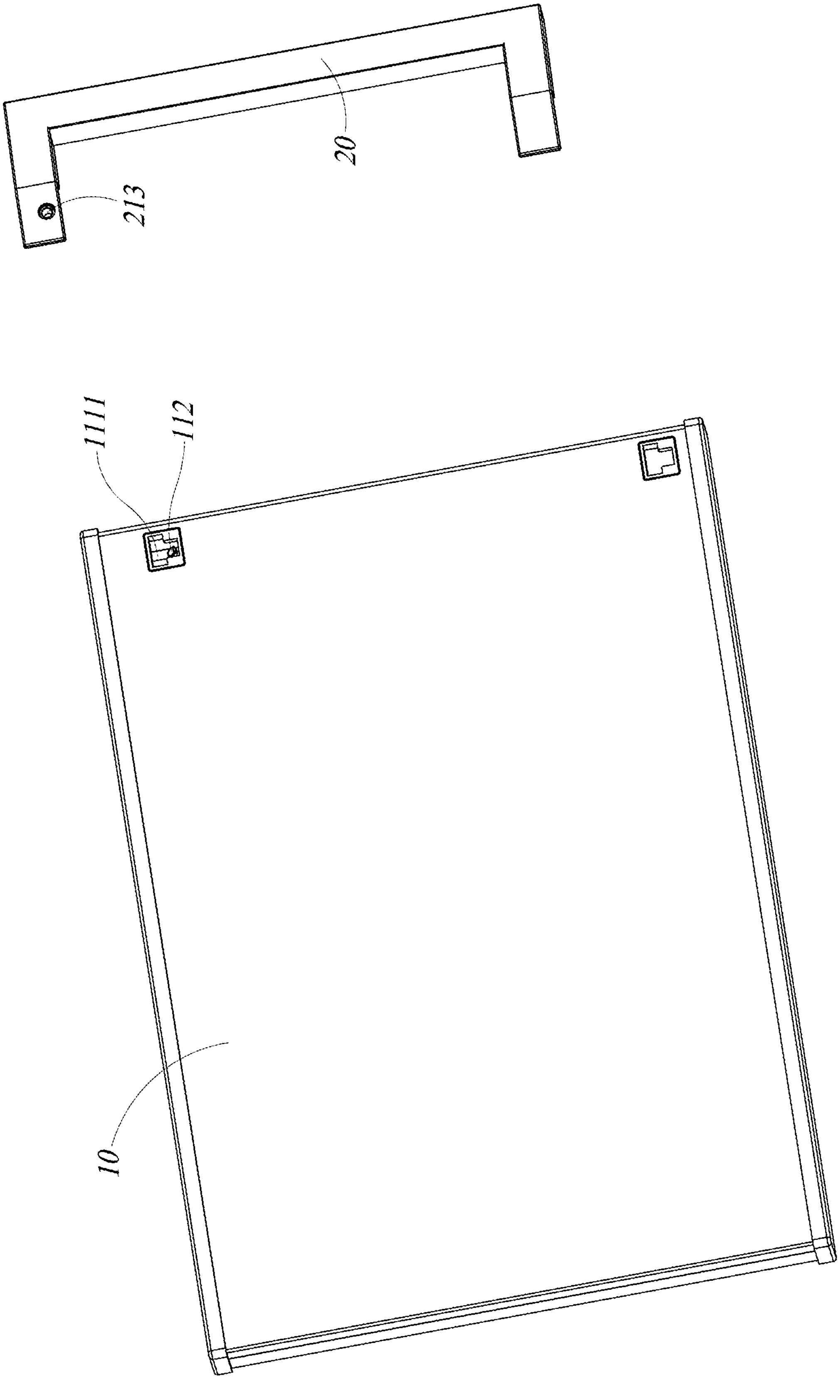
FIG. 10 is a schematic view where a door and a handle are disassembled.
Figure 11:
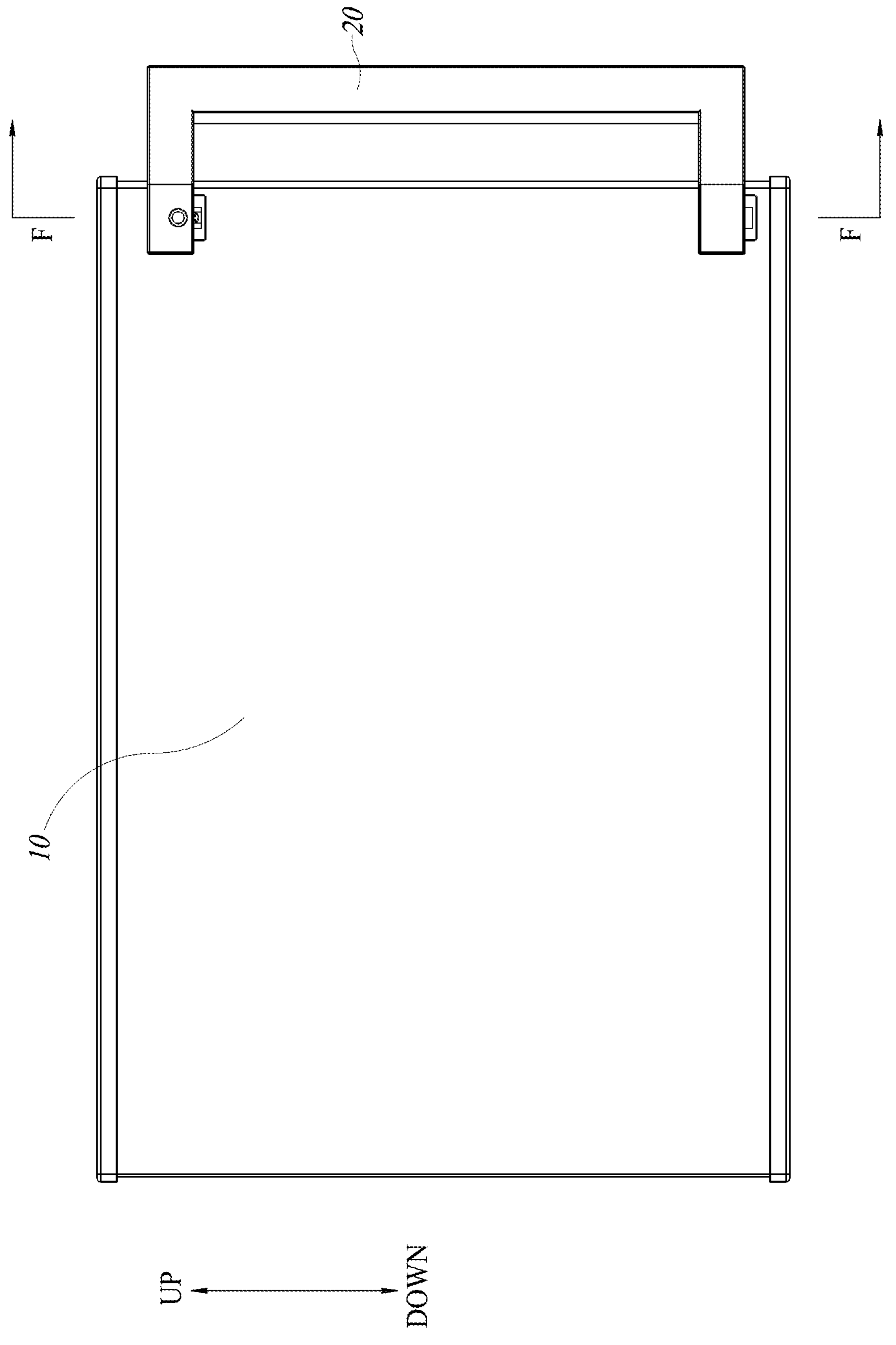
FIG. 11 is a front view where a door and a handle are not completely fitted (i.e., a limiting boss of the handle is simply placed in a handle groove)
Figure 12:
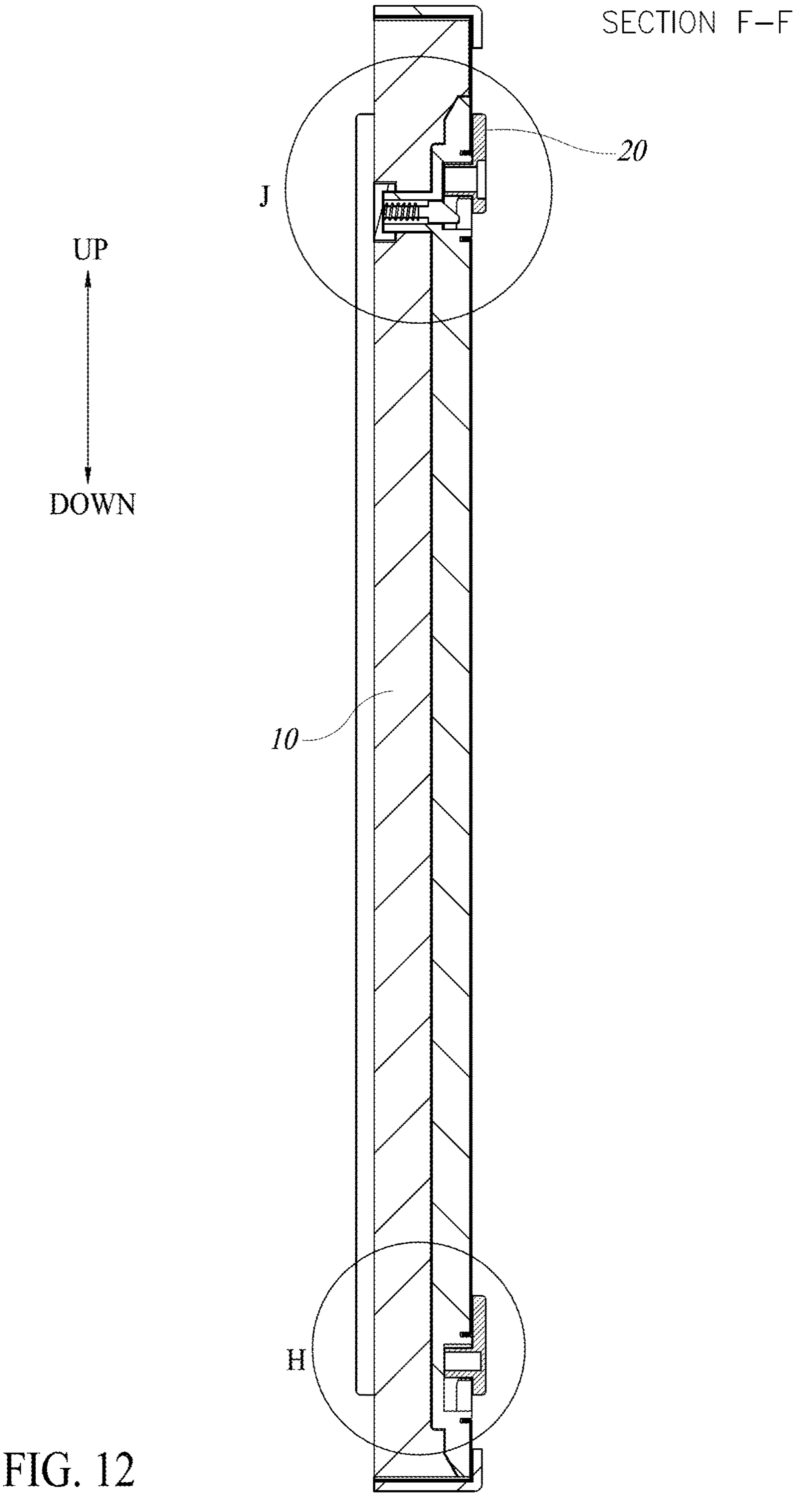
FIG. 12 is a sectional view taken along F-F in FIG. 11.

Further, referring to FIG. 9, the limiting boss may be a T-shaped boss 21, and the T-shaped boss 21 may include: a long boss 211 and a short boss 212 fixedly connected with each other. For example, a length of the long boss 211 is greater than a length of the short boss 212, and both ends of the short boss 212 are fixedly connected with the long boss 211 and the handle 20 respectively. The long boss 211 extends in a direction away from the handle 20. The length of the long boss 211 is less than or equal to the length of the handle groove 1111, so that the long boss 211 may enter the handle groove 1111.

In some embodiments, the limiting boss may also be a cross-shaped boss.

In a specific embodiment, the long boss 211 is suitable to move in the handle groove 1111, and the short boss 212 may be configured to be clamped between two limiting steps 1111*a* when the limiting groove 213 is aligned with the clamping slot 1112. That is, when the limiting groove 213 is aligned with the clamping slot 1112, the short boss 212 is clamped between two limiting steps 1111*a*, so that the handle 20 may be prevented from being directly withdrawn from the handle groove 1111, and movement of the handle 20 in a front-rear direction and in a left-right direction can be limited, improving reliability of the cooperation between the handle 20 and the door 10. Since a part of the retractable element 112 is clamped in the limiting groove 213, the movement of the handle 20 in the up-down direction is limited. Accordingly, the installation of the handle 20 on the door 10 is realized.

Further, an inner surface of the limiting step 1111*a* is spaced from a groove bottom of the handle groove 1111, so that the long boss 211 may enter a gap between the limiting step 1111*a* and the groove bottom of the handle groove 1111, and the long boss 211 of the T-shaped boss 21 may be stuck in the handle groove 1111.

Further, a thickness of the long boss 211 is equal to or slightly smaller than the gap between the limiting step 1111*a* and the groove bottom of handle groove 1111, preventing the T-shaped boss 21 from shaking in the handle groove 1111.

For example, a height of the limiting step 1111*a* is at least greater than half of a height of the long boss 211. As illustrated in FIG. 2, the height dimension of the limiting step 1111*a* extending upwards is greater than half of the height dimension of the long boss 211, to prevent the handle 20 from falling off the handle groove 1111, ensure the reliability of position limiting, and guarantee the high reliability of the installation of the handle 20.

For example, as shown in FIGS. 1-2, 5, 7, 13 and 17, the mounting assembly 11 may also include: a retaining cap 113 located on an innermost side of the mounting assembly 11 and fixedly connected to the pre-mounted member 111. The retaining cap 113 confines the elastic element 114 in the clamping slot 1112, to prevent the elastic element 114 from popping out from the pre-mounted member 111 toward the inner side of the door 10, and to ensure that the elastic element 114 may always be located in the clamping slot 1112, providing support for the retractable element 112.

Optionally, the elastic element 114 is a spring that has good elasticity, which may ensure that when the retractable element 112 moves towards the inner side of the door 10, the elastic element 114 is compressed and provides a force for the retractable element 112 to move to the outer side of the door 10, ensuring that the retractable element 112 may lock the handle 20 in time.

For example, the pre-mounted member 111 may be integrated with the door 10, that is, the handle groove 1111 is directly formed in the door 10, which omits the pre-mounted member 111, thus reducing the assembly process of the pre-mounted member 111 and the door 10, which can save the assembly time of the refrigerator 100.

In some embodiments, the pre-mounted member 111 and the door 10 may be fixed by foaming. In such a case, the pre-mounted member is used as a pre-embedded member. That is, after the pre-mounted member 111 is pre-embedded in the door 10, a liquid foaming material is injected into the door 10, expands through a chemical reaction, and eventually wraps the pre-mounted member 111, so that the door 10 is cured into a stable shape.

The household appliance according to an embodiment of another aspect of the present disclosure includes a door 10 and a handle assembly arranged on the door 10. In a specific embodiment, the household appliance may also be a disinfection cabinet, a microwave oven, and a baking oven, apart from the refrigerator 100 described above.

Further, the pre-mounted member 111 is integrated with the door 10, simplifying the installation process of the handle 20, ensuring that the handle 20 is easier to mount, and reducing the space occupied by the packaged household appliance, thus contributing to lower transportation cost. The mounting and dismounting processes of the handle assembly on and from the refrigerator 100 will be described in detail with reference to FIGS. 1-19.

When the handle 20 needs to be mounted, the pre-mounted member 111 is first mounted on the door 10, and then the limiting boss 21 of the handle 20 is inserted into the handle groove 1111 of the pre-mounted member 111. At this time, the position relationship between the door 10 and the handle 20 is shown in FIGS. 11-14. Then, the handle 20 is moved towards a lower side of the door 10, so that the short boss 212 of the limiting boss 21 of the handle 20 slides into the limiting step 1111*a*, and the inclined guide surface of the retractable element 112 comes out of the handle groove 1111 under the pressure of the limiting boss 21. When the handle 20 continues to move to a limited position, the long boss 211 is stuck between the limiting step 1111*a* and the groove bottom of the handle groove 1111, and the retractable element 112 is aligned with the limiting groove 213 of the handle 20. The retractable element 112 is pushed into the limiting groove 213 under an elastic action of the elastic element 114. At this time, the handle 20 is mounted in position and locked, so that the installation of the handle 20 is completed.

When the handle 20 needs to be dismounted, a fine rod capable of extending into the limiting groove 213 can be used to push the retractable element 112 out of the handle groove 1111 by extending into the limiting groove 213, and then the handle 20 is moved towards an upper side of the door 10, so that the handle 20 is withdrawn from the handle groove 1111. In such a way, the dismounting of the handle 20 is completed.

In the description of the present disclosure, reference to terms "one embodiment," "some embodiments," "an example," "a specific example," "some examples" or the like means that a particular feature, structure, material, or characteristic described in connection with the embodiment or example is included in at least one embodiment or example of the present disclosure. In this specification, the above terms are not necessarily referring to the same embodiment or example Furthermore, the particular features, structures, materials, or characteristics described may be combined in any suitable manner in one or more embodiments or examples. In addition, those skilled in the art may integrate and combine different embodiments or examples described in this specification.

Although embodiments of the present disclosure have been shown and described above, it would be appreciated by those skilled in the art that the above embodiments are exemplary and cannot be understood as limitation on the present disclosure, and various changes, modifications, alternatives and variants can be made to the above embodiments within the scope of the present disclosure.

What is claimed is:

1. A handle assembly, comprising:

a mounting assembly including a pre-mounted member and a retractable element, wherein a handle groove is arranged in the pre-mounted member, and the retractable element at least partially extends into the handle groove; and a handle including a limiting boss, wherein the limiting boss is configured to be arranged in the handle groove and includes a limiting groove, and the limiting groove is configured to secure the handle when the retractable element extends into the limiting groove;

wherein a clamping slot is arranged on the pre-mounted member and in communication with the handle groove, and the retractable element is configured to move in the clamping slot;

wherein the mounting assembly further comprises an elastic element coupled to the retractable element and configured to push the retractable element towards the handle groove;

wherein the retractable element has an inclined guide surface, wherein the inclined guide surface is configured in such a way that the handle presses the inclined guide surface and the retractable element is retracted from the handle groove when the handle moves along the handle groove towards the retractable element, and wherein the retractable element is configured to enter the limiting groove from the clamping slot under an elastic force of the elastic element when the limiting groove is aligned with the clamping slot; and wherein the handle groove has two limiting steps, and the limiting boss is a T-shaped boss and comprises a long boss and a short boss; and wherein the long boss is configured to move in the handle groove, and the short boss is configured to be clamped between the two limiting steps when the limiting groove is aligned with the clamping slot.

2. The handle assembly according to claim 1, wherein an inner surface of the limiting steps is spaced apart from a groove bottom of the handle groove.

3. The handle assembly according to claim 1, wherein a height of the limiting steps is greater than a half of a height of the long boss.

4. The handle assembly according to claim 1, wherein the mounting assembly further comprises a retaining cap configured to confine the elastic element in the clamping slot.

5. A household appliance, comprising a door and a handle assembly, the handle assembly including:

a mounting assembly including a pre-mounted member and a retractable element, wherein a handle groove is arranged in the pre-mounted member, and the retractable element at least partially extends into the handle groove; and a handle including a limiting boss, wherein the limiting boss is configured to be arranged in the handle groove and includes a limiting groove, and the limiting groove is configured to secure the handle when the retractable element extends into the limiting groove, wherein the mounting assembly is arranged on the door;

wherein a clamping slot is arranged on the pre-mounted member and in communication with the handle groove, and the retractable element is configured to move in the clamping slot;

wherein the mounting assembly further comprises an elastic element coupled to the retractable element and configured to push the retractable element towards the handle groove;

wherein the retractable element has an inclined guide surface, wherein the inclined guide surface is configured in such a way that the handle presses the inclined guide surface and the retractable element is retracted from the handle groove when the handle moves along the handle groove towards the retractable element, and wherein the retractable element is configured to enter the limiting groove from the clamping slot under an elastic force of the elastic element when the limiting groove is aligned with the clamping slot; and wherein the handle groove has two limiting steps, and the limiting boss is a T-shaped boss and comprises a long boss and a short boss; and wherein the long boss is configured to move in the handle groove, and the short boss is configured to be clamped between the two limiting steps when the limiting groove is aligned with the clamping slot.

6. The household appliance according to claim 5, wherein the pre-mounted member is integrated with the door.

7. The household appliance according to claim 5, wherein an inner surface of the limiting steps is spaced apart from a groove bottom of the handle groove.

8. The household appliance according to claim 5, wherein a height of the limiting steps is greater than a half of a height of the long boss.

9. The household appliance according to claim 5, wherein the mounting assembly further comprises a retaining cap configured to confine the elastic element in the clamping slot.

* * * * *